US006634165B2

(12) United States Patent
Tomlinson et al.

(10) Patent No.: US 6,634,165 B2
(45) Date of Patent: Oct. 21, 2003

(54) CONTROL SYSTEM FOR GAS TURBINE INLET-AIR WATER-SATURATION AND SUPERSATURATION SYSTEM

(75) Inventors: Leroy Omar Tomlinson, Niskayuna, NY (US); Richard Robert Trewin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/749,612

(22) Filed: Dec. 28, 2000

(65) Prior Publication Data

US 2002/0083712 A1 Jul. 4, 2002

(51) Int. Cl.[7] .................................................. F02C 3/30
(52) U.S. Cl. ........................................ 60/39.3; 60/39.53
(58) Field of Search ................................ 60/39.53, 775, 60/39.3

(56) References Cited

U.S. PATENT DOCUMENTS 2,874,537 A * 2/1959 Scarborough et al. ..... 60/39.53
2,952,974 A * 9/1960 Wright ...................... 60/39.53
4,667,465 A * 5/1987 Munk ........................ 60/39.53
5,054,279 A 10/1991 Hines
5,353,585 A * 10/1994 Munk ........................ 60/39.53
5,357,741 A 10/1994 Talabisco et al.
5,463,873 A * 11/1995 Early et al. .................... 62/121
5,471,831 A 12/1995 Rowe
5,930,990 A 8/1999 Zachary et al.
6,147,492 A 11/2000 Zhang et al.
6,250,064 B1 * 6/2001 Tomlinson et al. ........... 60/775
6,260,350 B1 * 7/2001 Horii et al. ................ 60/39.53
6,378,284 B1 * 4/2002 Utamura .................... 60/39.53

FOREIGN PATENT DOCUMENTS

EP 0 949 454 10/1999
WO WO 00 08327 2/2000

* cited by examiner

*Primary Examiner*—Michael Koczo
(74) *Attorney, Agent, or Firm*—Nixon & Vanderhye, P.C.

(57) ABSTRACT

A water-injection control system is disclosed for a water supersaturation system installed in a gas turbine air intake system for augmenting gas turbine power output during operation at high ambient-air temperature, while maintaining the water content in the intake air within limits acceptable to the gas turbine as indicated by measured gas turbine operating parameters. The control system starts, stops, modulates, and limits water supplied to the supersaturating system based on the humidity or dew-point temperature of the ambient air, dry-bulb temperature of the ambient air, compressor inlet air flow, and gas turbine parameters indicating operation at or near maximum output.

4 Claims, 4 Drawing Sheets

CONTROL SYSTEM FOR GAS TURBINE INLET-AIR WATER-SATURATION AND SUPERSATURATION SYSTEM

FIELD OF THE INVENTION

The present invention relates to the field of gas turbine control systems and, in particular, to water-injection systems that saturate and/or supersaturate with water the air stream entering the gas turbine.

BACKGROUND OF THE INVENTION

The saturation and supersaturation of air with water at the inlet of a gas turbine generally increases turbine power output. The injection of water into the inlet air is often done when operating gas turbines in conditions of high ambient-air dry-bulb temperature. Water will generally evaporate as it is injected into the compressor inlet air and before the air/water mixture enters the compressor inlet, provided that the mixture is no more than saturated with water as it enters the compressor.

Existing water-injection systems saturate or supersaturate the compressor inlet air to augment the gas turbine power output. Mechanical water-injection systems are available that cool the inlet air supplied to a gas turbine compressor by injecting water through an array of manifolds and atomizing nozzles. Water evaporation desirably cools the air entering the inlet guide vanes (IGVs) of the compressor. Generally, the lowest working fluid inlet temperature is achieved by saturating the inlet air with water. Thus, power output can be increased in a gas turbine with a water-injection system.

Supersaturation of the air/water mixture at the compressor inlet provides water in the inlet air that is not evaporated as it enters the compressor. Supersaturation performs at least two beneficial functions useful for increasing gas turbine power output including:

1. Injected water (which is not evaporated as it enters the compressor) does eventually evaporate as the working fluid (air/water mixture) flows through the compressor. Inter-compressor evaporation cools the working fluid passing through the compressor. Cooling of the working fluid within the compressor (intercooling) reduces the power required for its compression. The net gas turbine power output is the total turbine power output minus the compressor power input requirement. Any reduction in the power required by the compressor results in a net increase in gas turbine power output. This net power output gain is substantially equal to the reduction in compression power input.
2. The mass flow of the working fluid is increased by supersaturation. The compressor provides a constant volume of working fluid to the combustor of the gas turbine. The mass of the working fluid can be increased by supersaturating the air/water mixture entering the compressor. The specific volume of the liquid water mist is approximately $1/800^{th}$ of the specific volume of the air. Inversely, the mass flow of a supersaturated water mist is greater than that of a saturated air/water working fluid mixture. Turbine power output is directly proportional to the mass flow of working fluid. Due to its high mass, the added water in a supersaturated working fluid increases gas turbine power output. Accordingly, supersaturating the working fluid with water increases the mass flow of that fluid and the power output of the turbine.

The power output of a gas turbine can be increased when operating at high ambient-air dry-bulb temperature by injecting finely atomized water into the air flowing into the intake duct of the compressor, so that the compressor inlet air is supersaturated when entering the compressor. Conventional supersaturation water-injection systems might consist of a single set of manifolds and nozzles in the duct, or might be divided into two injection sections of manifolds and nozzles. Gas turbine power augmentation can be maximized by dividing the injection system into two sections, the upstream section which saturates the air with water and a second downstream section located at or near the compressor inlet that supersaturates the air.

An atomized water spray-type saturation system (fogger) with controls is described in U.S. Pat. No. 5,463,873. Prior systems for supersaturating the air supplied to a compressor inlet of a gas turbine have generally consisted of a single grid of atomized spray nozzles located in the air intake duct. Systems typical of these are described in U.S. Pat. Nos. 5,867,977 and 5,930,990. European Patent No. EP 0 781 903 A2, entitled "Gas Turbine with Water Injection" describes systems for supersaturating air supplied to the compressor inlet of a gas turbine, including a divided saturation and supersaturation system. A divided water-injection/cooling system divides the water-injection system into two sets of manifolds and nozzles. A first injection system of manifolds and nozzles provides sufficient atomized water to "saturate" the inlet air, and sufficient residence time of the water in the air to enable complete evaporation of the water in the air before it enters the IGVs of the compressor. The water-saturated air from the first injection system enters a second injection system with its own set of manifolds and nozzles to inject additional water in order to supersaturate the air.

A potential danger of supersaturating the air/water mixture entering the compressor is that water droplets can damage the compressor. Droplets can agglomerate from the fine water mist in the fluid or from excess water mist that is injected into a supersaturated air/water mixture. Large water droplets in the mist can impact and corrode compressor blades and stators. Blade erosion can occur due to large water droplets in the working fluid of a compressor. A control system is needed to operate water-injection systems for gas turbines. The control system is needed to maximize power augmentation due to water injection, and to avoid the compressor blade erosion and other harmful effects of excessive water injection.

BRIEF SUMMARY OF THE INVENTION

Applicants have invented novel control systems for saturation and saturation/supersaturation water-injection systems for gas turbines. The control systems regulate the quantity of water injected into the inlet air supplied to the compressor by the saturation and/or supersaturation sections of a water-injection system. The control systems optimize power augmentation and limit water injection to comply with certain gas turbine limitations. These control systems also regulate the injection of water to maximize the power increase and minimize the potential for compressor-blade erosion.

Specifically, the control systems start, stop and modulate/regulate the quantity of water injected into the compressor air. These systems maximize power output of the gas turbine, minimize erosion of the compressor blades, and limit operation of the power-augmentation system to suitable and advantageous conditions. When the water-injection grids (e.g., manifolds and atomizing nozzles) are divided, water injection to each grid is controlled so that the air is at or near saturation when discharging from the saturating grid, and then modulates the water flow to the supersaturating section, within limits as indicated by air flow and other gas turbine parameters.

Individually controlling the water injected by each section of a divided injection system provides several advantages including:

(i) Ensuring that the injected air fully saturates the air/water mixture at the compressor inlet. Saturating the air using a first injection grid enables the temperature of the air/water mixture to be reduced to near or at the wet-bulb temperature for the air/water mixture by the first grid. The temperature is reduced due to evaporation of the water added by the first system.

(ii) Increasing the power output of the gas turbines by reducing as the temperature of the working fluid (air/water mixture) entering and passing through the compressor. The power output increases because of: (1) an increase in cycle mass flow of the working fluid through the gas turbine caused by an increase in the density of that fluid, and (2) an increase in the cycle temperature ratio (ratio of firing temperature to compressor inlet temperature) due to a decrease in compressor inlet temperature.

Separating the water mist injection systems for saturating and supersaturating sections of the integrated system and modulating the water flow to each individually enables the system to accommodate widely varying atmospheric humidity conditions, while maintaining air/water mixture composition to optimize gas turbine power output while simultaneously maintaining the operation of the supersaturating system within satisfactory limits to prevent erosion of compressor blades. If the ambient-air humidity is low, a significant amount of water can be injected into the air in the saturating section, while the maximum quantity of water can still be safely injected in the supersaturating section.

If the ambient air is already saturated, no water can be evaporated in the saturating system. In such a saturated ambient-air condition, the control system does not inject water into the saturating section of the injection system. Although water should not be injected to the saturation system when the ambient air is saturated with water, water can still be injected by the supersaturating section. Thus, water injection can be performed to augment gas turbine power output, even in high humidity conditions.

The controls for the water-injection systems avoid injecting water, such that ice will form in the compressor. The dry-bulb temperature for the water-saturated air entering the gas turbine compressor should be maintained above the temperature where there is potential for freezing of water on the compressor IGVs or first-stage rotor blades. This temperature must be maintained sufficiently above the water freezing point to avoid freezing the water in the air/water mixture as it is accelerated through the inlet volute and compressor IGVs. If ice forms on the compressor IGVs or rotating blades, air flow is reduced, which reduces power output. Also, if ice accumulates and subsequently breaks off the IGVs or first-stage rotor blade, the ice can cause significant mechanical damage to downstream stages. The controls for the water-injection system should exclude operation of the saturation and supersaturation system during conditions when freezing of water in the compressor may occur.

Saturation of the gas turbine inlet air will generally increase the thermal efficiency of the gas turbine (or a combined steam and gas turbine power generation system) within which the gas turbine is incorporated when the gas turbine is at or near maximum output. When the operator sets the power output at a load lower than maximum power output, the thermal efficiency is reduced by operating the saturating system because the gas turbine will operate at a point further from its design point, where the design point is the best efficiency point. Supersaturation of the gas turbine inlet air will, at lower loads, similarly decrease the thermal efficiency of the gas turbine or combined cycle system. Therefore, the control system may exclude operation of the saturation system and/or supersaturation systems, except when the gas turbine is operating near or at its maximum output.

An embodiment of the disclosed water-injection control system is for a water supersaturation system installed in a gas turbine air intake system for augmenting gas turbine power output during operation at high ambient-air temperature, while maintaining the water content in the intake air within limits acceptable to the gas turbine. The mechanical components of the injection system include an atomized water spray-type supersaturation system consisting of multiple manifolds and atomizing nozzles installed in the gas turbine air intake duct or in the gas turbine compressor inlet hood and an auxiliary system for delivering a controlled flow of water to each manifold that consists of a water storage tank, water pump, piping control valves, and flow sensors. The water injection control system starts, stops, modulates, and limits water supplied to the supersaturating system based on the ambient-air humidity or dew-point temperature, ambient-air dry-bulb temperature, air flow at the compressor inlet, and gas turbine parameters indicating operation at or near maximum output.

Another embodiment of the water injection control system is for an atomized-water spray-type evaporative cooler installed in a gas turbine air-intake system for cooling the air entering the gas turbine compressor which augments gas turbine power output during operation at high ambient-air temperature. The mechanical components in the cooler include an atomized-water spray-type evaporative cooler consisting of multiple manifolds and nozzles installed in the air-intake system in a location with low air velocity and sufficient residence time to enable evaporation of the water injected into the intake air before it enters the gas turbine compressor and an auxiliary system for delivering a controlled water flow to each manifold that consists of a water storage tank, water pump, piping, control valves, and a water-flow sensor for each manifold. The water injection control system starts, stops, and modulates water supplied to the evaporative cooler based on humidity or wet-bulb temperature of the ambient air, dry-bulb temperature of the ambient air, dry-bulb temperature of the air downstream of the evaporative cooler, air flow at the compressor inlet, and gas turbine operating parameters that indicate operation at or near maximum output.

A further embodiment of the water injection control system is for a divided, two-stage water-saturation and supersaturation system installed in a gas turbine air intake system for augmenting gas turbine power output during operation at high ambient-air temperature which optimizes gas turbine power output and efficiency while maintaining the water content in the intake air within limits acceptable to the gas turbine based on measured gas turbine operating parameters. The mechanical components in the divided injection system include an atomized-water spray-type saturation section with multiple manifolds and nozzles installed in a section of air-intake duct with large flow area so that the air velocity is low; an atomized-water spray-type supersaturating section with multiple manifolds and nozzles installed in the air-intake duct downstream of the saturation section or in the gas turbine's compressor inlet hood with atomized water flowing directly into the compressor blade path; an auxiliary system for delivering a controlled flow of water to the saturating section and supersaturating section individually that consists of water storage tank, water pump, piping, control valves, and flow sensors. The water injection control system starts, stops and modulates the water supplied to the saturating section and the supersaturating section individually based on the ambient-air humidity or wet-bulb temperature, ambient-air dry-bulb temperature, compressor inlet air flow, dry-bulb temperature of the air/water mixture downstream of the saturating section, water flow to each manifold and gas turbine operating parameters which indicate high output.

Another embodiment of the water-injection control system is for a water supersaturation system installed in a gas turbine air intake system downstream of a media-type evaporative cooler for augmenting power output during operation at high ambient-air temperature which optimizes gas turbine power output and efficiency while maintaining water content in the intake air within limits acceptable to the gas turbine based on measured gas turbine operating parameters. The mechanical components of the supersaturation system includes a media-type saturation section installed in a section of air-intake duct with large flow area where velocity is low: an atomized-water spray-type supersaturating section installed in the gas turbine's compressor inlet hood with atomized water flowing directly into the compressor blade path; an auxiliary system for delivering a controlled amount of water to the supersaturating section that consists of a water storage tank, water pump, piping, control valves, and flow sensors; a second auxiliary water system for the media-type saturating section that consists of water sump, recirculation pump, blow-down valve, potable-water makeup valve, piping etc. For the media-type evaporative cooler, the control system starts and stops the circulation pump for the media-type evaporative cooler based on the dry-bulb temperature of the ambient air, humidity or dry-bulb temperature of the ambient air, and gas turbine parameters that indicate that the gas turbine is operating at or near maximum output and modulates makeup water to the evaporative-cooler sump. For the supersaturation system the control system starts, stops, modulates and limits the water supplied to each manifold in the supersaturating section based on ambient-air dry-bulb temperature, dry-bulb temperature of water/air mixture downstream of the evaporative cooler, air flow at the compressor inlet, water flow to each manifold, and gas turbine operating parameters which indicate power output at or near maximum,

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
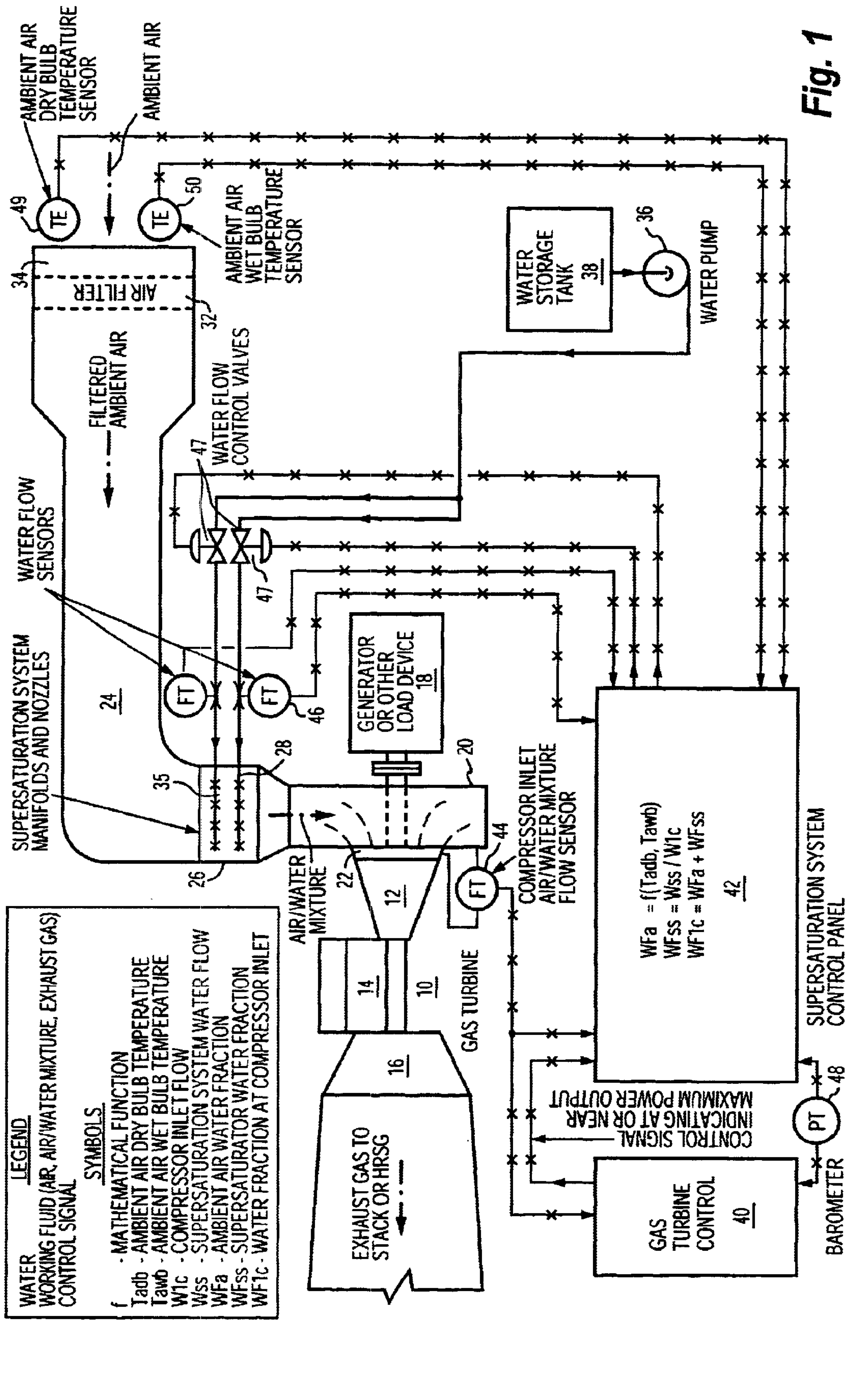
FIG. 1 is a schematic diagram of a control system for a first embodiment of a gas turbine system having a water-injection system.

FIG. 1 is a diagram of a first embodiment of a gas turbine air intake system having a supersaturation water-injection system. The gas turbine 10 includes a compressor 12, combustion section 14, a turbine 16 and a turbine exhaust system. The working fluid of the gas turbine is the air/water mixture that enters the compressor, is mixed with fuel in the combustion section where it is converted to hot gases and then exits as exhaust gases. The output of the gas turbine may be coupled to a generator 18 or other power load.

The air/water mixture enters the compressor through an air duct 24 and air inlet hood 20, and passes through the IGVs 22 of the compressor. Within the compressor, the mixture is progressively compressed as it passes through a series of compressor stages which generally include a cascade of stators and rotating compressor blades, and might include a centrifugal-compressor stage. The entrance to the air inlet hood 20 is connected to a water-injection system 26, which includes a single stage of water-injection atomizing nozzles and manifolds 28 that distribute water to the nozzles from a water-supply pipe. Air enters the injection system from air ducts 24 that include an air filter 32 and an entrance air scoop 34. Ambient air enters the scoop, is filtered and is ducted to the water-injection system. The water-injection system nozzles 35 spray an atomized water mist into the air flowing through the air duct 24. The water for the nozzles is supplied by a water pump 36 and a water tank 38 that are connected to the manifold via water piping. Water is injected into the air to supersaturate the air stream with water. The air/water mixture passes to the gas turbine and enters the IGVs, where the mixture becomes the working fluid of the gas turbine.

A conventional gas turbine control system 40, such as a General Electric Mark V™ control system, governs the operation of the gas turbine 10. Associated with the control system is a control system 42 for the water-injection system. These control systems may be integrated into a single computer system. The control systems receive input signals for a variety of sensors monitoring the condition and operation of the gas turbine, such as rotational speed sensors detecting the rotational speed of the rotor, air flow sensors (FT) 44 detecting the pressures and working fluid pressures (static and dynamic pressures) at the compressor inlet, temperature sensors in the compressor and turbine that measure the temperatures of the working fluid at the compressor inlet and other locations in the gas turbine.

Other sensors may include water-flow sensors (FT) 46 that measure the amount (rate) of water flowing to the manifolds and through the nozzles of the water-injection system 26. These water-flow sensors provide a feed-back signal to the water-injection controller 42 which the controller compares to an intended flow rate. The controller operates the water valves 48 50 that the actual water flow rate corresponds to the intended rate, and thereby regulates the amount of water being injected into the air entering the compressor. Sensors also monitor ambient conditions such as barometric pressure with a barometer pressure sensor (PT) 48, and ambient temperature with a dry-bulb temperature sensor (TB) 49 and a wet-bulb temperature sensor (TB) 50. The sensor signals are transmitted to the controller via conventional means, such as electrical wires, wireless links, and other communications paths.

The water-injection control system 42 optimizes the gas turbine power augmentation by controlling the water for saturation and supersaturation of intake air and to maintain the water content in the intake air within operational limits acceptable to the gas turbine. For example, the controller 42 might initiate water injection after the gas turbine is operating at or near a full-speed, full-load (FSFL) condition. The controller executes algorithms that govern the operation of the injection system. The control system might include a computer system receiving sensor inputs from the gas turbine, various pressure and temperature sensors, air and water flow sensors. A processor in the computer evaluates the sensor inputs and determines appropriate water flow rates to the saturation and/or supersaturation manifolds/nozzles of a water-injection system. The processor accesses a computer-memory unit to retrieve stored data from the sensor measurements and gas turbine operating parameters, and retrieve the algorithm(s) which use this data to generate outputs useful in controlling the water-injection systems. The computer may issue a command signal to a water valve 47 and/or water pump 36 to cause the desired water flow rate. The control system 42 is responsive to gas turbine operating parameters and ambient-air conditions. The control system may be integrated with or into the computer system 40 for the gas turbine control system. The system is applicable for controlling water spray-type evaporative coolers (air saturation system), single water-injection grid-type supersaturation systems, two stage supersaturation systems and other water-injection systems.

The water-injection control system 42 controls the start, stop, modulation and limits water injected in a supersaturation system with a single set of manifolds and atomizing nozzles. The control system performs these functions based on input signals from the compressor air flow sensor 44, the dry-bulb temperature of the ambient air or the air flowing in the duct upstream of the supersaturation system as measured by sensor 49, the wet-bulb temperature or humidity of the ambient air or the air flowing in the duct upstream of the supersaturation system as measured by sensor 50, the water flow sensors 46 in each manifold water supply line, and gas turbine parameters (as measured by conventional gas turbine control sensors) that indicate that the gas turbine is operating at or near maximum output.

The control system for the water-injection system performs specific control functions including:

1. Start the supersaturation system water pump 36 and open the water stop valve 48, when ambient-air conditions are satisfactory and gas turbine is operating at or near maximum power output.
2. Modulate the water flow to the manifolds 35 such that the water flow range is satisfactory to achieve effective water atomization by the water-injection nozzles. The water flow feedback signal from the single water pump 36 and set of control valves 48 is shown to regulate the water flow to each manifold. A system which includes a pump with variable-speed drive and appropriate controls for each manifold may also be used. In a system with a variable-speed water pump, the controller 42 could adjust both the valve position and pump speed to regulate the water pressure and flow rate to the injection manifold and nozzles.
3. Regulate the total water flow to the supersaturation system to maintain a water-fraction (WF) setpoint for the air/water mixture downstream of the supersaturation system based on the water fraction in ambient air as determined by: the dry-bulb and wet-bulb temperatures of the ambient air, measured water flow to the supersaturation system, and compressor air flow as sensed by the flow sensor on the gas turbine air intake or other flow measurement system. An exemplary algorithm to determine water flow is:

$$Wss = WFss + W1c$$

where Wss is the total water flow to the supersaturation system; WFss is the water fraction to the water-injection system 26; and W1c is the flow of dry air (air without water vapor) at the compressor inlet.

An exemplary algorithm to determine water fraction is:

$$WF1c = WFa + WFss$$

where WF1c is the water fraction at the compressor/IGV inlet; WFa is the water fraction of ambient air (WFa=f (Tadb, Tawb)); WFss is the supersaturator water fraction to the water-injection system 26; Tadb is ambient dry-bulb temperature; Tawb is ambient wet-bulb temperature, and "f" indicates a functional relationship between the input parameters, e.g., Tadb and Tawb, and an output, e.g. Wfa.

4. Limit water flow to the supersaturation system based on limiting the water fraction in the air/water mixture downstream of the supersaturation system, e.g., at compressor inlet, to minimize erosion of compressor blades or other gas turbine limits. The control system modulates water flow to maintain the limiting water fraction within the limit.
5. Stop injecting water by stopping the water flow to the manifold/nozzles when ambient-air conditions are not suitable for water injection, e.g., humidity becomes too high or temperature too cold, or when the gas turbine parameters indicate that it is not operating at or near maximum output.

Figure 2:
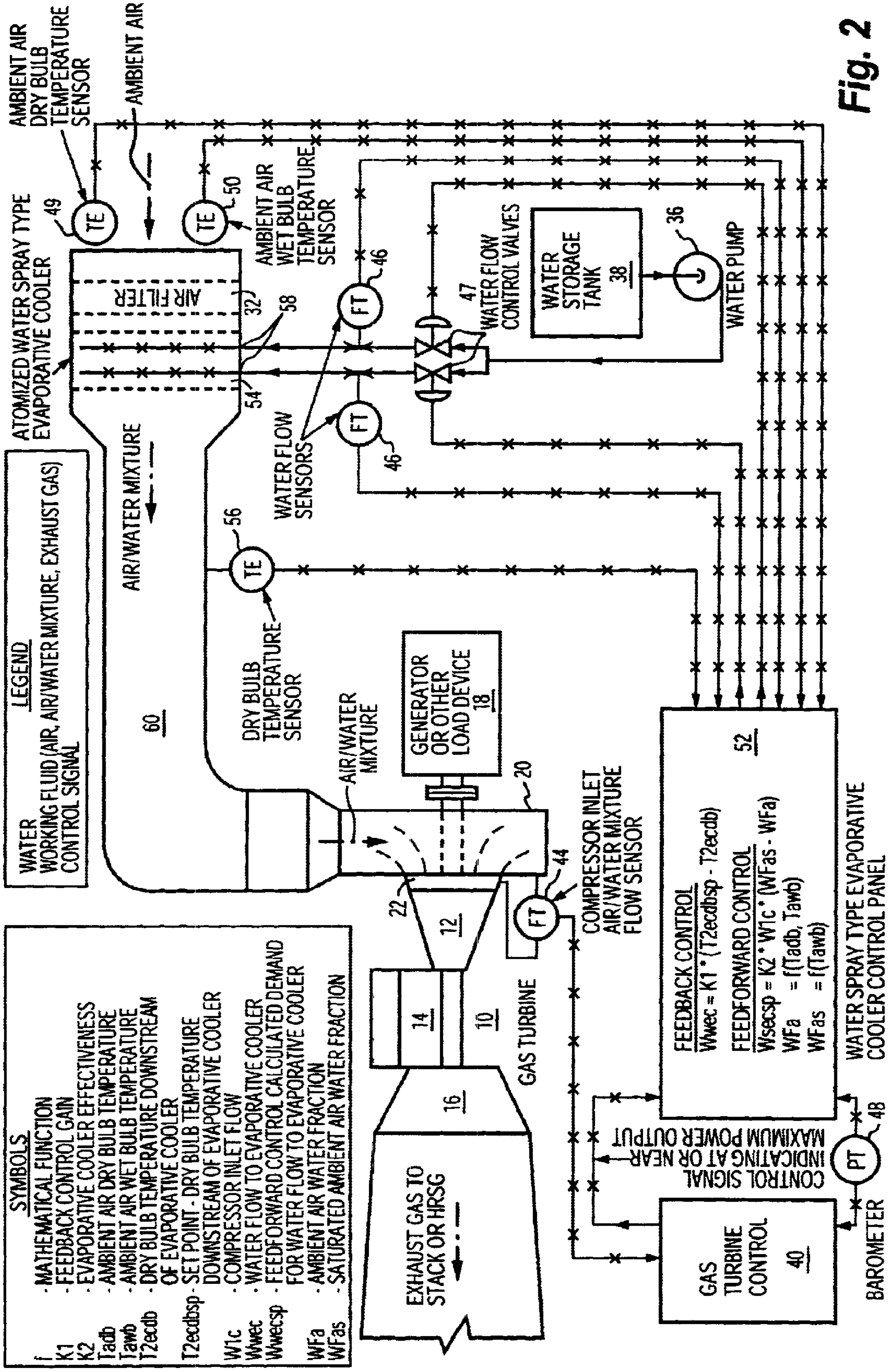
FIG. 2 is a schematic diagram of a second embodiment of a control system for a gas turbine system having a water-injection system.

FIG. 2 shows a second embodiment of a saturation water-injection control system 52 that starts, stops, modulates and limits water injection into the gas turbine intake air in an atomized water spray-type saturation system (evaporative cooler) 54. The control system performs these functions based on input signals from an ambient-air dry-bulb temperature sensor 48, ambient-air wet-bulb temperature or humidity sensor 50, a dry-bulb temperature sensor 56 located in the air duct at some distance downstream of the evaporative cooler (so that substantial evaporation of the water occurs before passing over sensor 56), a compressor air flow sensor 44, and flow sensors 46 in the water supply line to each manifold.

Specific control functions performed to the second embodiment of the control system 52 include:

1. Start the evaporative cooler water pump 36 and open the water stop valves 48 when the ambient-air conditions are satisfactory, and gas turbine parameters indicate that the gas turbine is at or near maximum output. Satisfactory ambient-air conditions are typically dry-bulb temperature above 59° F. (15° C.), and the relative humidity in the ambient air is greater than 10%.
2. Regulate the water flow to each manifold 58 such that the flow range is satisfactory to achieve effective atomization of the water spray by the nozzles attached to the manifolds. The water flow/pressure to the manifold may be controlled solely by the valves 48 (especially where the water pump is a single speed pump) or a combination of the valves 48 and a variable-speed water pump.
3. Regulate the total water flow to the evaporative cooler 54 to maintain a predetermined dry-bulb temperature setpoint as measured by the dry-bulb temperature sensor 56 in the inlet air/water ducting 60 downstream of the evaporative cooler. This dry-bulb temperature set point may be calculated by the control system 52, as the ambient-air wet-bulb temperature plus a fraction, approximately 5–10%, of the difference between the ambient-air dry-bulb and wet-bulb temperatures. An exemplary algorithm for feedback control of water flow to the evaporative cooler is:

$$W_{wec}=K_1(T2_{ecdbsp}-T2_{ecdb}),$$

where $W_{wec}$ is the water flow rate to the cooler; $K_1$ is the gain of the feedback controller (and is determined for each injection system design); $T2_{ecdbsp}$ is the setpoint for the dry-bulb temperature downstream of the cooler, and $T2_{ecdb}$ is the actual dry-bulb temperature (sensor 56) downstream of the cooler. Thus, $W_{wec}$ is a function of the difference between the actual dry-bulb temperature downstream of the cooler and the setpoint dry-bulb temperature.

Due to the water in the air/water mixture flowing through the duct 60, the dry-bulb sensor 56 in the duct often becomes wet. A wet dry-bulb sensor can potentially generate an incorrect dry-bulb temperature signal. If the dry-bulb temperature sensor 56 is wetted by liquid water carryover from the evaporative cooler, it will indicate a wet-bulb temperature (not a dry-bulb temperature). The erroneous web bulb temperature will be below the dry-bulb temperature setpoint and, thus, cause the controller 42 to react to erroneous dry-bulb data and become unstable. To prevent the control instability that typically results from wet dry-bulb sensors, the control system 52 converts to a feed-forward system with water flow demand calculated from the ambient-air dry-bulb and ambient wet-bulb temperature. Based on these temperature measurements, the controller modulates the water flow to be sufficient to satisfy the dry-bulb temperature setpoint downstream of the evaporative cooler. An exemplary algorithm for the feed-forward control is $$W_{secsp}=K_2*W1_c*(WF_{as}-WF_a)$$

where $W_{secsp}$ is the feed-forward control calculated demand for water rate flow to the cooler; $K_2$ is the evaporative cooler effectiveness; $W1_c$ is the air/water flow rate (sensor 44) to the compressor; $WF_{as}$ is the saturated ambient-air water fraction ($WF_{as}$=f (Tawb)), and $WF_a$ is the water fraction of the ambient air ($WF_a$=f(Tadb, Tawb)).

4. Stop water flow to the evaporative cooler when ambient-air conditions are not suitable or when gas turbine parameters indicate that it is not operating at or near maximum output. A satisfactory ambient-air condition for operating the evaporative cooler may include that the ambient-air dry-bulb temperature is above 59° F. (15° C.).

Figure 3:
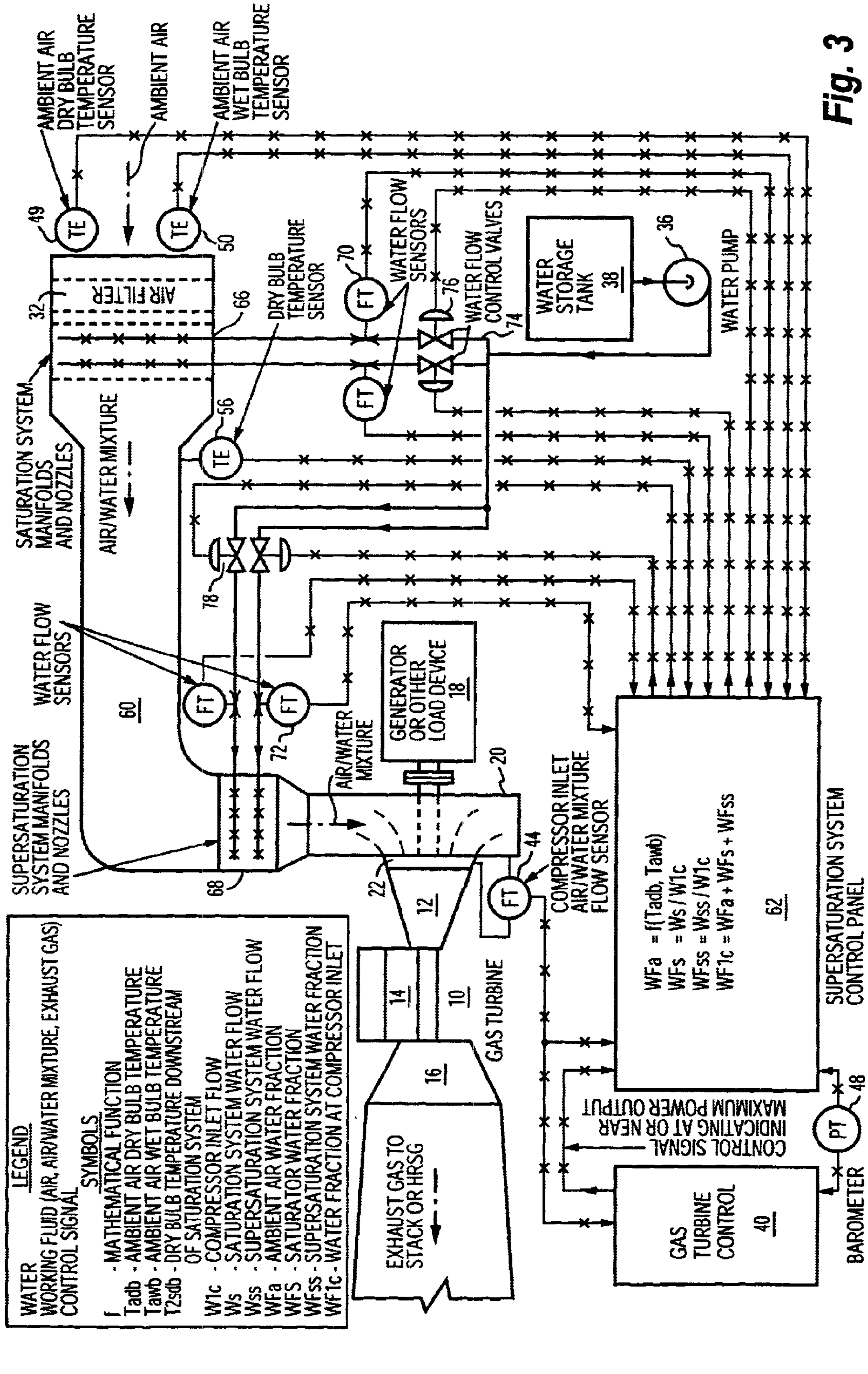
FIG. 3 is a schematic diagram of a third embodiment of a control system for a gas turbine system having a water-injection system.

FIG. 3 shows a third embodiment of a water-injection system control system 62 that starts, stops, modulates and limits water injected into the intake air stream of a gas turbine. The control system is for a divided supersaturation water-injection system 62 having two sets of atomized water spray manifolds and nozzles 66, 68. The first set of manifolds and atomization nozzles 66 injects water sufficient to saturate the air stream. After the water injection by the first set of manifolds and nozzles, there is sufficient residence time for the air/water mixture in the duct 60 to evaporate the water before the water saturated air passes into the second set of manifolds and atomization nozzles 68. The second set of manifolds and nozzles 68 supersaturates the air. This control system 62 coordinates the supersaturation system based on input signals received from the dry-bulb temperature sensor of ambient air 48, wet-bulb temperature or humidity sensor of ambient air 50, compressor air flow sensor 44, dry-bulb temperature sensor of water-saturated air 56, water flow sensors 70, 72 in the water supply pipe 74 to each manifold in the saturating and supersaturating sections, and signals from the gas turbine control indicating satisfactory operating conditions, for operation of the integrated saturation and supersaturation system.

Functions performed by the control system 62 for the divided water injection system include:

1. Start and stop the water pump 36 based on inputs from the ambient-air dew-point temperature or humidity sensor 50, ambient-air dry-bulb temperature sensor 48, and signals from the gas turbine control indicating that the gas turbine operating parameters are satisfactory for operation of the two-stage saturation and supersaturation system.
2. Regulate the water flow to each manifold 66, 68 such that each manifolds/nozzle set operates in a flow range that is satisfactory to achieve effective water atomization by the nozzles. Regulation of the water flow to the manifolds may be accomplished by controlling the water flow valves 76, 78 alone to each manifold (especially were a single, speed water pump is used) or by controlling the water flow valves and pump 36 speed, where there is a variable-speed pump.
3. Regulate the total water flow to the saturating section 66 of the divided water-injection system based on a feedback control signal set to a dry-bulb temperature setpoint of water-saturated air and compared to a feed-forward control based input from the compressor air flow sensor 44, dew-point temperature or humidity sensor of ambient air 50 and dry-bulb temperature sensor of ambient air 48. The dry-bulb temperature setpoint of water-saturated air is determined from the measured dew-point temperature and a constant offset, e.g., 5% to 10%, above dew-point temperature. The feedback signal is the temperature measured by the dry-bulb temperature sensor of water-saturated air 48.

There is potential for wetting the dry-bulb temperature sensor of the water-saturated air so that it indicates wet-bulb temperature or some value between the two. Thus, the control transfers to a feed-forward mode if the measured temperature is below the setpoint. In the feed-forward mode, the control calculates the required water flow based on the dry-bulb temperature of ambient air, wet-bulb temperature of ambient air and the compressor air flow.

4. Regulate the total water flow to the supersaturating section 68 to maintain a water fraction setpoint for the air/water mixture downstream of the supersaturation system based on water fraction in the ambient air as calculated from the dry-bulb temperature and wet-bulb temperature of the ambient air, measured water flow to the saturation section and the supersaturation section, and the compressor air flow as sensed by the flow sensor on the gas turbine compressor air inlet volute or other flow measurement system. Exemplary algorithms to determine the water fractions are:

$$WF_s=W_s/W1c,$$

where $WF_s$ is the water fraction contributed by the saturation system 66; $W_s$ is the water flow (sensor 70) to the saturation system, and W1c is the flow of dry air (air without water vapor) at the compressor/IGV inlet.

$$WF_{ss}=W_{ss}/W1c,$$

where $WF_{ss}$ is the water fraction contributed by the supersaturation system 68 and $W_{ss}$ is the water flow (sensor 72) to the supersaturation system.

$WF1c=WF_a+WF_s+WF_{ss}$

5. Limit the water flow to the supersaturation section 68 based on limiting the water fraction in the air/water mixture downstream of the supersaturation system to minimize erosion of compressor blades or other gas turbine limits. The signals employed are those used in item 4 above and the control system reduces water flow to the supersaturation section 68 so as to maintain the limiting water fraction when the demand equals or exceeds the limit.
6. Stop water flow to the saturation section 66 when ambient-air conditions are not suitable or when the gas turbine is not operating at or near maximum power output. Suitable ambient-air conditions for water injection into the intake air are typically a dry-bulb temperature above 59° F. (15° C.) and a relative humidity above approximately 5–10% (as measured by the wet-bulb temperature or humidity sensor 50).
7. Coordinate the operation of the saturation section 66 and supersaturation section 68 to achieve maximum gas turbine efficiency. The water-injection control system 62 can inhibit the operation of the saturating section 68 when the relative humidity of ambient air is unsatisfactory, (e.g., dry-bulb temperature below 59° F. (15° C.) and a relative humidity below 5–10%), and still command water injection by the supersaturation system 68 when the relative humidity of ambient air is high, if the dry-bulb temperature of the ambient air is satisfactory, typically above 59° F. (15° C.).

In addition, when water-injection operation of the system is initiated and ambient-air conditions are satisfactory for operation of the saturation section 66, that section 66 will start first since it will improve gas turbine thermal efficiency. The supersaturation section 68 is the least favorable power augmentation system since it can decrease the gas turbine thermal efficiency. Thus, the supersaturation section may be initiated when additional gas turbine power output is required above that achieved using just water injection by the saturating section, and to achieve a setpoint for the dry-bulb temperature (sensor 56) in the duct 60 downstream of the saturation section.

Figure 4:
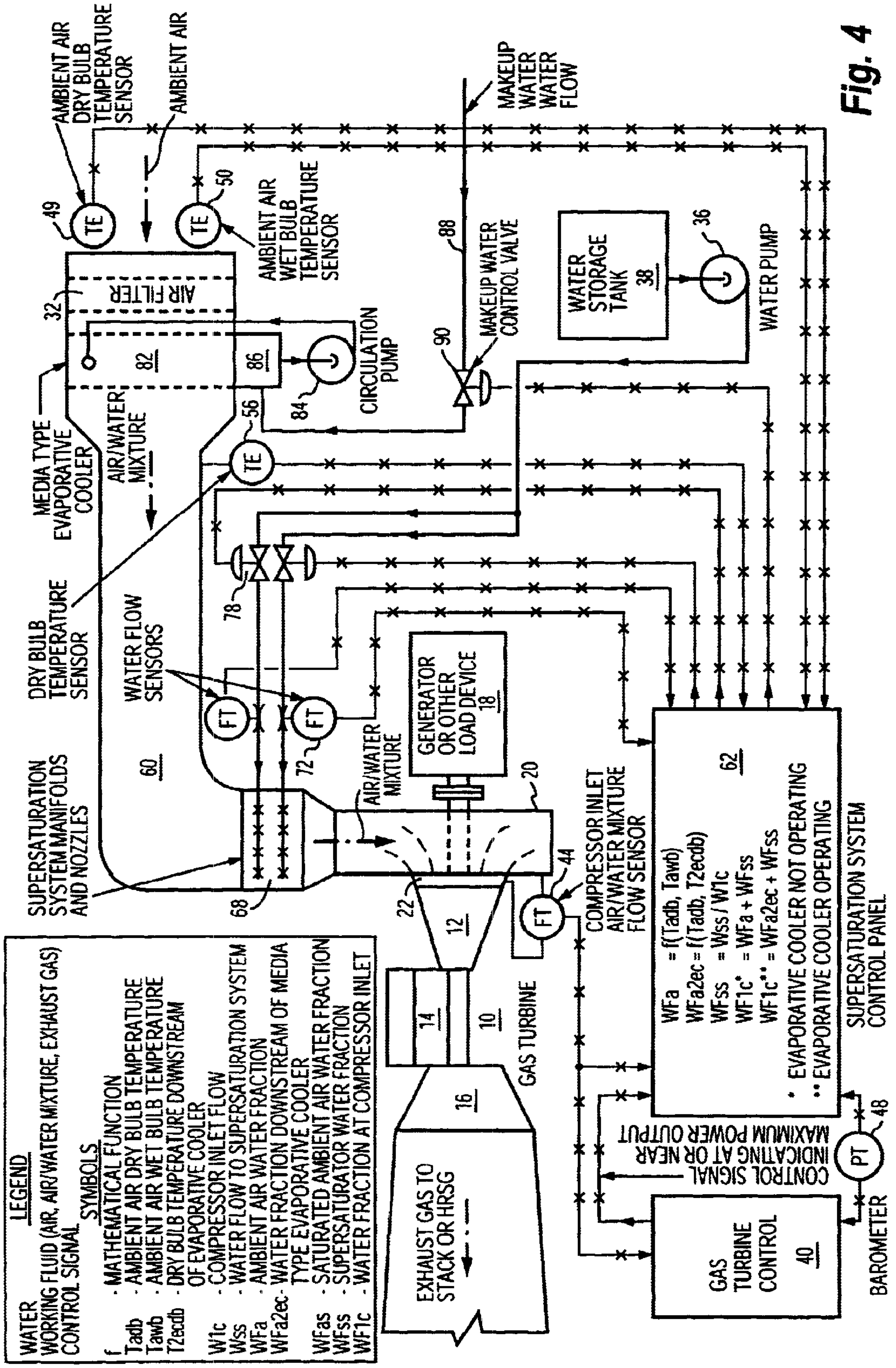
FIG. 4 is a schematic diagram of a fourth embodiment of a control system for a gas turbine system having a water-injection system.

FIG. 4 presents a schematic diagram of a fourth embodiment of a water-injection control system 80 for starting, stopping, modulating/regulating and limiting the water flow to a water supersaturation system consisting of one set of atomized water spray manifolds and nozzles 68 installed in a gas turbine intake air system downstream of a media-type evaporative cooler 82. The control system 80 starts and stops the evaporative cooler 82 and coordinates the operation of the supersaturation system 68, generally after the evaporative cooler is operating.

Functions performed by the control system 62 include:

1. Start and stop the evaporative cooler 82 by starting or stopping a water recirculation pump 84 based on input from the dew-point temperature or humidity sensor 50, dry-bulb temperature sensor of ambient air 48, and signals from the gas turbine controller 40 indicating that gas turbine operating conditions are satisfactory for operation of the evaporative cooler 82. Suitable ambient-air conditions for operation of the evaporative cooler are typically a dry-bulb temperature above 59° F. (15° C.) and a relative humidity below 90 to 95%. These conditions typically result in conditions of the air at the inlet to the compressor that do not lead to ice formation.
2. Perform typical control functions for an evaporative cooler which can include to control of the water makeup to the sump 86 to maintain appropriate water level (the water makeup may be controlled by adding additional water to the sump via water line 88 and water valve 90, which is controlled by the water-injection controller 62), and to control the blow-down from the sump to maintain circulated water impurities to a satisfactory level.
3. Regulate the water flow to the manifold in the supersaturating section 68 such that it operates in a flow range satisfactory to achieve effective atomization by the nozzles. Regulation of the water flow to the manifold 68 may be accomplished by controlling the water flow valves 78 alone to the manifold (especially were a single speed water pump is used) or by controlling the water flow valves and pump 36 speed, where there is a variable-speed pump.
4. Regulate the total water flow to the supersaturating section 68 so as to maintain a water fraction setpoint for the air/water mixture downstream of the supersaturation system based on the calculated water fraction in air/water mixture upstream of the supersaturating section based on dry-bulb temperature of ambient air and the dry-bulb temperature of the air/water mixture in the duct downstream of the evaporative cooler plus the measured water flow to the supersaturation section divided by the measured air/water mixture flow entering the compressor. Exemplary control algorithms are:

$WF1c=WF_a+WF_{ss}$, when cooler is not operating.

$WF1c=WF_{azec}+WF_{ss}$, when cooler is operating, $WF_{azec}=f(T_{adb}, T_{zecdb})$ where $T_{zecdb}$ is the dry-bulb temperature (sensor 56) downstream of cooler.

5. Limit the water flow to the supersaturation section 68 based on a water fraction maximum threshold in the air/water mixture downstream of the supersaturation system to minimize erosion of compressor blades or for other gas turbine limits. The signals employed are those used in item 4 above and the control system regulates total water flow to the supersaturation section in order to reduce water fraction.
6. Stop water flow to the saturation (evaporative cooler) section 82 when ambient-air conditions are not suitable or when gas turbine operating parameters indicate that it is not operating at or near maximum output. Suitable ambient-air conditions for injecting water into the intake air are typically a dry-bulb temperature above 59° F. (15° C.).
7. Coordinate the operation of the media-type evaporative cooler 82 and the supersaturation section 68 to achieve maximum gas turbine efficiency. The control system 80 may inhibit operation of the media-type evaporative cooler if the ambient-air relative humidity is not satisfactory, e.g., humidity is above 90% to 95%, but allow water injection by the supersaturation system if the ambient-air temperature is satisfactory if the dry-bulb temperature is above 59° F. (15° C.).

When ambient-air conditions are satisfactory and operation of the system to add water to the intake air is initiated, the media-type evaporative cooler will start first to improve the gas turbine power output and thermal efficiency. The supersaturation system 68 is the least favorable power augmentation system since it decreases gas turbine thermal efficiency, so it will be initiated only if power output is required above that achieved with the evaporative cooler operating.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control system for a water injection system of a gas turbine having a compressor, combustion section and a turbine said system comprising:

at least one water content sensor at an entrance to an air intake duct of the compressor generating data indicative of a water content of air entering the duct, a processor executing an algorithm for determining a rate of water to be injected by the water injection system into the air flowing through the intake duct based on the total water fraction, wherein the total water fraction is a function of a water fraction of water injected by the water-injection system into compressor inlet air flow and a water fraction of ambient air entering the air intake duct, a water flow rate sensor detecting a rate of water flowing to the water injection system, and data and program memory storing the data indicative of water content and water flow rate, and the algorithm for execution by the processor, wherein said processor generates an output of the algorithm to control a rate of water flowing to the water injection system.

2. A control system for a water-injection system in a gas turbine air intake system comprising:

an atomized water spray supersaturation system having water atomizing nozzles positioned in an air duct upstream of a compressor for the gas turbine; and a water system for delivering a controlled flow of water to the atomizing nozzles;

wherein said control system regulates water supplied to the nozzles to maintain a total water fraction of the inlet air flow to the compressor within a predetermined total water fraction limit, wherein the total water fraction is a function of a water fraction of water injected by the water-injection system into compressor inlet air flow and a water fraction of ambient air entering the air duct, wherein said water fraction of ambient air is determined from at least one factor of a group of factors consisting of ambient-air humidity and dew-point temperature.

3. A control system for a water-injection supersaturing system as in claim 2, wherein the water system includes a manifold distributing water to the nozzles, and said manifold being supplied with water from a water storage tank and a water pump.

4. A water injection system for injecting water into inlet air entering a compressor of a gas turbine comprising:

an evaporative cooler having a plurality of manifolds and water nozzles to spray water into an air intake of the compressor, said cooler upstream in the intake, and a control system operatively coupled to the evaporative cooler, wherein said control system regulates water supplied to the evaporative cooler to maintain a total water fraction of the inlet air flow to the compressor within a predetermined total water fraction limit, wherein the total water fraction is a function of a water fraction of water injected by the water-injection system into the inlet air flow and a water fraction of ambient air entering the air intake, wherein said water fraction of ambient air flow is determined from at least one factor of a group of factors consisting of humidity of the ambient air flow and dew point temperature of the ambient air flow.

* * * * *

UNITED STATES PATENT AND TRADEMARK OFFICE

CERTIFICATE OF CORRECTION

PATENT NO. : 6,634,165 B2 
DATED : October 21, 2003
INVENTOR(S) : Tomlinson et al.

It is certified that error appears in the above-identified patent and that said Letters Patent is hereby corrected as shown below:

Column 1,
Line 52, delete "system 62" and insert -- system 80 -- therefor.

Column 6,
Line 43, delete "of the rotor," and insert -- of the sensor, -- therefor.
Line 55, delete "valves 48 50" and insert -- valves 48 so -- therefor.
Line 61, delete both occurrences of "(TB)" and insert -- (TE) -- therefor.
Lines 66-67, delete "for saturation and" and insert -- supersaturation or -- therefor.

Column 7,
Line 1, delete "water content in the intake air" and insert -- water-injection system -- therefor.

Signed and Sealed this

Ninth Day of December, 2003

JAMES E. ROGAN
*Director of the United States Patent and Trademark Office*